United States Patent [19]

Crawford et al.

[11] Patent Number: 4,655,650

[45] Date of Patent: Apr. 7, 1987

[54] SELF-CLEANING HIGH SPEED BORING TOOL

[75] Inventors: Thomas A. Crawford; William H. Russell, both of Jackson, Mich.

[73] Assignee: Unique Industries, Incorporated, Jackson, Mich.

[21] Appl. No.: 782,948

[22] Filed: Sep. 26, 1985

[51] Int. Cl.$^4$ .................. B23D 77/02; B27G 15/00
[52] U.S. Cl. .................. 408/225; 408/61; 408/230; 408/713; 409/137
[58] Field of Search .......... 408/56, 60, 61, 67, 408/80, 68, 81, 82, 83, 58, 224, 225, 229, 230, 713; 409/137

[56] References Cited

U.S. PATENT DOCUMENTS

| | | | |
|---|---|---|---|
| 2,283,491 | 5/1942 | Daley | 408/83 |
| 2,334,795 | 11/1943 | Smith | 408/83 |
| 2,599,887 | 6/1952 | Beese | 408/83 |
| 3,213,716 | 10/1965 | Getts | 408/713 |
| 3,333,489 | 8/1967 | Mossberg | 408/60 |
| 3,963,366 | 6/1976 | Eckle et al. | 408/713 |
| 4,096,771 | 6/1978 | Monro | 408/83 |
| 4,340,327 | 7/1982 | Martins | 408/713 |

FOREIGN PATENT DOCUMENTS 631703  6/1936  Fed. Rep. of Germany ........ 408/58

Primary Examiner—John Sipos
Assistant Examiner—Donald R. Studebaker
Attorney, Agent, or Firm—Beaman & Beaman

[57] ABSTRACT

The invention pertains to a self-cleaning high speed core boring tool for enlarging an existing deep hole. The elongated tool includes a shank held within a rotating tool holder, a central portion upon which cutting elements are mounted in diametrically located relationship, and the forward end of the tool comprises a cylindrical extension having a pair of spiral flutes defined therein each of which communicates with a cutting element for receiving chips. The flutes spiral in a direction opposite to the direction of tool rotation during boring whereby chips received within the flutes are displaced forwardly of the cutting elements to keep the cutting area free of chips.

11 Claims, 5 Drawing Figures

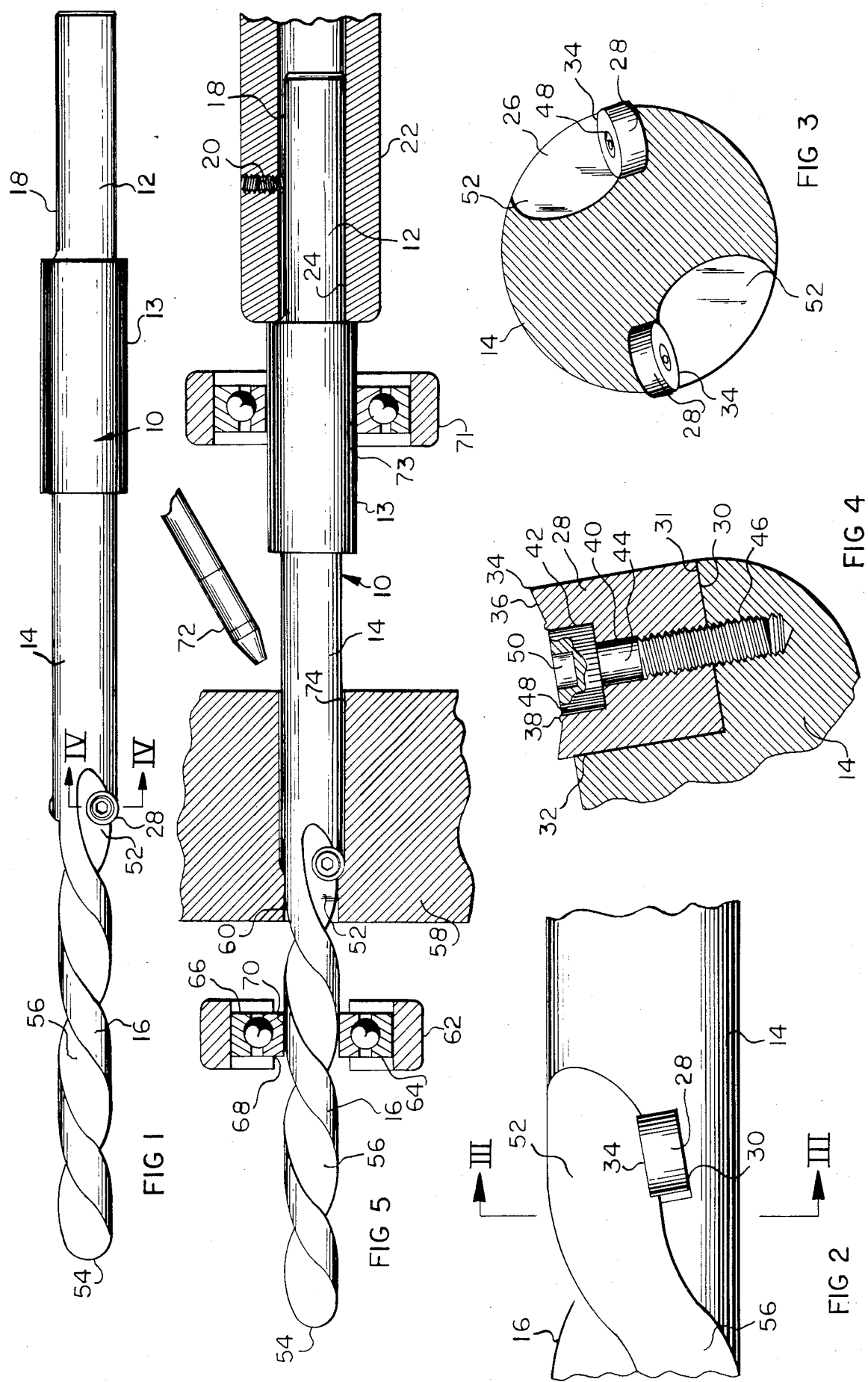

SELF-CLEANING HIGH SPEED BORING TOOL

BACKGROUND OF THE INVENTION

Boring and drilling operations produce chips of removed material adjacent the tool cutting edges, and these chips must be removed if continuous and accurate cutting is to be achieved. A number of "chip breakers" have been utilized with the cutting edges of metal removing tools such as drills, reamers, boring tools, turning tools and milling cutters, and such chip breakers usually employ surfaces or abutments defined adjacent the cutting edge for engaging the chip and abruptly changing its direction, or interfering with its movement, to impose a force on the chip causing the chip to break into small pieces which may be cleared from the cutting location.

During twist drilling operations, the chip is removed at the forward end of the drill where the cutting edge engages the workpiece, and the chip is received within a drill flute. If the hole being drilled is relatively shallow, the chip will usually move through the flute, and is thrown from the drill due to the centrifugal forces existing because of the drill rotation. If the hole being drilled is relatively deep, the chips within the drill flutes cannot be thrown clear, and it is common for the chips to accumulate within the flute and bind against the wall of the drilled hole. In such instance the cutting action of the drill ceases, the drill overheats and may break within the hole. When drilling deep holes the drill must be repeatedly removed from the hole and the flutes cleared before drilling resumes, and a single continuous forward drill movement cannot be maintained. The aforementioned problems also exist in core boring operations where an existing hole is enlarged, and chip accumulation will prevent continuous drilling unless the chips are removed.

When drilling or boring relatively deep holes, or enlarging existing deep core holes, even with the use of lubricating and coolant fluids, the accumulation of chips within the flutes is particularly troublesome, and the chip accumulation prevents the fluid from engaging the tool cutting edge and overheating and accelerated wear of the cutting edge is experienced.

It is an object of the invention to provide a core boring tool capable of quickly enlarging an existing deep hole with a continuous unidirectional axial movement wherein chips of removed metal are quickly removed from the cutting region.

A further object of the invention is to provide an elongated self-cleaning core boring tool for enlarging previously existing deep holes wherein chips removed by the tool's cutting edges are quickly removed from the location of cutting in the direction of tool axial movement.

Another object of the invention is to provide a self-cleaning boring tool of economical construction which is capable of accurately enlarging an existing hole in a minimum of time and with high accuracy.

An additional object of the invention is to provide a self-cleaning core boring tool of elongated configuration capable of enlarging an existing deep hole wherein the tool is piloted with respect to the hole being formed and a high degree of accuracy and tool alignment may be maintained.

Yet another object of the invention is to provide a self-cleaning core boring tool using spiralled flutes to receive chips from the cutting edges wherein the cutting edges are so oriented as to deflect chips into the flutes, and wherein the flutes are spiralled in a direction opposite to that of the tool rotation.

In the practice of the invention the core boring tool is of an elongated configuration having a cylindrical shank defined at the rear of the tool for being received within a chuck or similar rotating tool holder of conventional construction. The central region of the tool comprises a cutting portion and a pair of cutting elements are defined upon the central portion in diametrically opposed relationship. The forward portion of the tool constitutes a cylindrical extension having a pair of spiralled flutes defined therein, and the flutes extend into the central portion adjacent and behind the cutting elements wherein each flute is in communication with a cutting element.

The flutes formed in the forward extension are spiralled in a direction opposite to that the tool is rotated during boring, and chips removed during the boring are deflected toward and into the associated flute for displacement forwardly from the location of cutting to keep the cutting area chip-free.

Preferably, liquid coolant is injected into the hole being formed in the workpiece rearwardly of the cutting elements, and the coolant tends to wash the chips forwardly through the extension flutes. Additionally, a forward pilot is preferably located adjacent the workpiece for receiving the extension during boring and a rear pilot engages the shank whereby the pilots will insure that the tool does not run off-center during cutting.

The cutting elements comprise cylinders of hard alloy, preferably carbide, attached to the tool central portion by screws, and by using cutting tools having a circular periphery the cutting edge makes substantial contact with the workpiece establishing an effective heat transfer between the cutting element and workpiece whereby the cold metal of the workpiece cools the cutting element while the flutes convey away the hot chips. Because of this action a coolant is not always required and the removal of heat by the chips is aided by the fact that the cutting elements are obliquely oriented to the axis of the tool for directing the chips into the associated flute.

BRIEF DESCRIPTION OF THE DRAWINGS

The aforementioned objects and advantages of the invention will be appreciated from the following description and accompanying drawings wherein:

FIG. 1 is an elevational view of a self-cleaning core boring tool in accord with the invention, FIG. 2 is a detail, enlarged, side elevational view of the central portion of the tool illustrating a cutting element, FIG. 3 is an elevational, sectional, enlarged view taken along Section III—III of FIG. 2, FIG. 4 is an enlarged, sectional, detail view taken through a cutting element along Section IV—IV of FIG. 1, and FIG. 5 is an elevational view, partially in section, illustrating the preferred arrangement of the components utilized in a core boring system employing the tool of the invention.

DESCRIPTION OF THE PREFERRED EMBODIMENT

With respect to FIG. 1, a core boring tool in accord with the invention includes a body 10 having a cylindrical rear shank portion 12, a central cutting portion 14, and a forward extension 16, the portions of the tool being in coaxial relationship defining the elongated tool configuration.

The cylindrical shank 12 includes a flat 18 whereby a set screw 20, FIG. 5, within the tool holder 22 may contact the flat for holding the shank within the tool holder bore 24 and transmitting torque thereto. The shank portion 13 is cylindrical and of an enlarged diameter for a purpose later described. It is to be appreciated that the shank 12 may be of any conventional boring tool configuration, such as of a standard tapered form, as to be readily received within a conventional rotating tool holder.

The central portion 14 is of a cylindrical configuration axially spaced from the shank 12, and is coaxial with the extension and supports the extension. A cutting element 28 is mounted upon each side of the cutting portion 14 in diametrically opposed relationship to each other, and in the preferred embodiment, the cutting elements comprise cylindrical elements of carbide.

The cutting elements 28 each seat upon the flat surface 30 on bottom surface 31, FIG. 4, and are partially surrounded by the cylindrical surface 32 defined in the cutting portion 14. The elements 28 each include a circumferential circular cutting edge 34 which lies within a plane. The cutting element is relieved at 36, FIG. 4, and a chip breaking ridge 38 is formed on the element for deflecting and breaking chips removed from the workpiece by the edge 34.

The cutting elements 28 include a central bore 40, and are countersunk at 42 for receiving the bolt 44 which threads into the threaded hole 46 formed on the cutting portion 14 intersecting surface 30, and the bolt head 48 is received within the countersunk recess 42. The head 48 includes a wrench receiving socket 50 for rotating the bolt.

The bottom surface 31 of the cutting elements 28 is parallel to the plane of the cutting edge 34 and the cutting portion surface 30 is obliquely related to the axis of the tool so that the plane of the cutting edge 34 is inclined inwardly toward the associated flute extension 52, FIG. 3, and forwardly toward the extension 16. As will be appreciated from FIGS. 1 and 5, the maximum diameter of the cutting portion 14 occurs at the outermost portion of the cutting edges 34 which determines the diameter of the hole to be bored by the tool.

The extension 16 is of a cylindrical configuration having a radiused forward end 54 and the length of the extension is greater than the depth of the hole to be bored. The extension 16 is provided with a pair of spiralled flutes 56 similar to those commonly used with a twist drill, and each flute spirals the length of the extension from the end 54 to the cutting portion 14 wherein the flutes 56 each blend into a flute extension 52 in which a cutting element 28 is located.

The purpose of the extensions 52 and flutes 56 is to receive the chips removed by the cutting elements 28, and the flutes 56 are spiralled in the opposite direction that the tool is rotated during boring. For instance, if the tool is rotated in the conventional clockwise or right-hand direction during boring, the flutes 56 are spiralled in a counterclockwise or left-hand direction.

The preferred components of a self-cleaning core boring system utilizing the concepts of the invention are shown in FIG. 5. The tool holder 22 is rotatably driven by an electric motor, not shown, and is capable of axial advancement and retraction as occurs in a drill press, and conventional drilling machine tools. The metal workpiece is illustrated at 58, and includes a predrilled core hole 60 of a diameter only slightly greater than the diameter of the extension 16. The hole 60 is in coaxial alignment with the axis of the tool holder 22.

A pilot 62 is located adjacent the workpiece 58 on the opposite side thereof with respect to the tool holder 22, and the pilot 62 may be stationarily supported by any conventional apparatus. The pilot includes an anti-friction bearing 64 having an outer race 66 supporting an inner race 68 upon balls. The inner race 68 includes a bore 70 coaxial with the axis of the tool holder 22 and the workpiece hole 60, and of a diameter slightly less than the diameter of the tool extension 16.

A similar pilot 71 is preferably located on the side of the workpiece 58 nearest the tool holder 22, and the pilot 71 includes a bore 73 for closely slidably receiving the shank diameter 13.

A nozzle 72 is located adjacent the workpiece 58, as apparent in FIG. 5, wherein a lubricating and coolant fluid may be injected into the hole being bored, in the conventional manner.

In operation, the tool holder 22 and tool body 10 will be retracted to the right, FIG. 5, wherein the nose 54 of the extension 16 is in alignment with the workpiece core hole 60, but has not entered the hole. The tool holder begins to rotate and axially displaces the rotating tool to the left. Such action causes the extension 16 to enter the workpiece hole 60 and the extension 16 will pass through the workpiece and enter the bore 70 of pilot 62. At the same time shank diameter 13 will enter bore 73 of pilot 71. Preferably, the extension 16 will be received within the pilot bore 70 and diameter 13 will enter pilot bore 73 prior to the cutting elements 28 engaging the workpiece.

Continued movement of the tool to the left, FIG. 5, causes the cutting elements 28 to engage the workpiece and bore the enlarged hole 74, FIG. 5. This cutting action produces a heavy flow of chips from the cutting edges 34 which are displaced toward the associated flute extension 52. As the chips enter the adjacent flute recess 52 they will be deflected forwardly because of the configuration of the flute extension and the oblique angle of the cutting edge, and the flow of the coolant through the hole 74 and past the cutting elements 28 will "flush" the chips forwardly through the flutes 56 and clear the cutting region adjacent the cutting elements. The flushing action of the coolant is effective in that the flute portions 52 extend rearwardly of the cutting elements 28 into the hole 74. Thus, the coolant may readily enter the hole 74 and pass over the cutting edges 34 to effectively apply coolant where it is most effectively utilized, and simultaneously, flush the chips forwardly through the flute extensions 52 and flutes 56.

The boring operation continues until the cutting elements 28 have passed through the workpiece 58, and at such time the tool may be retracted to the right, FIG. 5.

A core boring tool construction in accord with the invention is capable of boring relatively large holes 74 very quickly without adversely affecting the cutting elements due to overheating or overloading. As both the chips and the coolant are moving in the same direction through the workpiece, the coolant is effectively utilized as compared to the usual situation where the coolant flow is counter to the chip flow, as when using a twist drill.

The presence of the mass of the cutting portion 14 and the extension 16 adjacent the cutting elements produces a "heat sink" adjacent the cutting elements which rapidly conveys the generated heat from the cutting edges 34. In addition to the "heat sink" effect the rapid feed rate of the tool causes the cutting edges 34 to be "buried" into the cold metal of workpiece 58. The generated heat is carried off by the chips entering the flutes 56 and the temperature of the cutting elements and the workpiece remains relatively low. The effectiveness of this heat transfer to the chips and rapid feed of the cutting elements permits boring of some materials and holes to be accomplished without a coolant. Even without the presence of a coolant, the chips within the flutes tend to be displaced forwardly due to frictional engagement with the wall of the hole 60 and the force vectors being applied to the chips due to the rotation of the tool. The chips within the flutes will be forced to the left, FIG. 5, due to the inclination of the spiralled flutes as the tool rotates clockwise.

It will be appreciated that various modifications to the inventive concepts may be apparent to those skilled in the art without departing from the spirit and scope of the invetion.

We claim:

1. A boring tool for enlarging an existing hole in a workpiece having a given diameter wherein the tool and workpiece are relatively rotated in a rotating cutting direction and the tool is axially fed into the workpiece in a forward direction characterized by its ability to rapidly remove metal from deep holes comprising, in combination, an elongated tool body having an axis, a rear shank, a central cutting portion, and a forward chip removal portion forward of said central cutting portion with respect to the direction of axial tool movement during boring, cutting means defined on said central cutting portion, said forward chip removal portion comprising an elongated extension coaxial with said shank and central cutting portion having a transverse dimension less than the given diameter of the hole being enlarged, at least one axially extending spiral flute defined on said extension in communication with said cutting means whereby chips produced by said cutting means are received within said flute, said flute spiralling about said extension in the opposite direction of the tool and workpiece rotating cutting direction whereby the chips removed by said cutting means are displaced forwardly of said cutting means in the forward direction of axial tool movement.

2. In a boring tool as in claim 1, said cutting means comprising at least one cutting edge defined on said central cutting portion at a greater radial dimension from said tool body axis than the radial dimension of said extension.

3. In a boring tool as in claim 2, said cutting means comprising a pair of cutting edges defined at diametrically opposite locations on said central cutting portion, a pair of spiral flutes defined on said extension, each flute being in communication with a cutting edge.

4. In a boring tool as in claim 3, said cutting means comprising hardened elements having said cutting edges defined thereon, said cutting means cutting edges lying in a plane obliquely oriented to said tool body axis whereby chips removed from a workpiece by said cutting edges are directed toward the associated extension flute.

5. In a boring tool as in claim 1, said extension having an outer cylindrical configuration whereby said extension may be received within a cylindrical pilot.

6. A boring tool for enlarging an existing hole in a work piece having a given diameter wherein the tool and workpiece are relatively rotated in a rotating cutting direction and the tool is axially fed into the workpiece in a forward direction characterized by its ability to rapidly remove metal from deep holes comprising, in combination, an elongated tool body having an axis, a rear shank, a central cutting portion, and a forward chip removal portion forward of said central cutting portion with respect to the direction of axial tool movement during boring, a pair of cutting elements mounted upon said central cutting portion at diametrically opposed locations thereon, said forward chip removal portion comprising an elongated cylindrical extension coaxial with said shank and central cutting portion having a diameter less than the given diameter of the hole being enlarged, a pair of axially extending spiral flutes defined in said extension spiralling about said extension in the opposite direction of the tool and workpiece rotating cutting direction, each of said flutes being in communication with a cutting element whereby chips removed by said cutting elements are displaced forwardly through said flutes in the forward direction of axial tool movement.

7. In a boring tool as in claim 6, said cutting elements each having a cutting edge obliquely oriented to said tool body axis whereby chips removed from a workpiece by said cutting edges are directed toward the associated extension flute.

8. A boring system for enlarging an existing hole in a workpiece having a given diameter wherein the tool and workpiece are relatively rotated in a rotating cutting direction and the tool is axially fed into the workpiece in a forward direction characterized by its ability to rapidly remove metal from deep holes comprising, in combination, an elongated tool body having an axis, a rear shank for mounting within a rotating axially movable tool holder, a central cutting portion, and a cylindrical extension coaxially extending forwardly of said central cutting portion with respect to the direction of axial tool movement during boring having a diameter less than the given diameter of the existing hole, a pair of cutting elements mounted upon said central cutting portion at diametrically opposed locations thereon, a pair of axially extending spiral flutes defined in said extension the length thereof and spiralling in the opposite direction of the tool and workpiece rotating cutting direction, each of said flutes being in communication with a cutting element to receive chips therefrom and a fixed pilot having a bore in alignment with the workpiece hole and of a diameter closely slidably receiving said extension whereby said extension is received within said pilot bore during boring and chips are displaced forwardly through said flutes in the forward direction of axial tool movement.

9. In a boring system as in claim 8, liquid coolant supply means introducing coolant into the workpiece hole being drilled behind said cutting elements with respect to the direction of tool axial movement, said coolant aiding chip movement through said flutes.

10. In a boring system as in claim 8, said pilot including an anti-friction bearing, said pilot bore being defined within said bearing.

11. In a boring system as in claim 8, said cutting elements each having a cutting edge obliquely oriented to said tool body axis whereby chips removed from a workpiece by said cutting edges are directed toward the associated extension flute.

* * * * *